US012752206B2

(12) United States Patent
Ko et al.

(10) Patent No.: US 12,752,206 B2
(45) Date of Patent: Oct. 6, 2026

(54) FIGURE AND MANUFACTURING METHOD THEREOF

(71) Applicants: Hyungjun Ko, Seoul (KR); Junghwan Park, Seongnam-si (KR)

(72) Inventors: Hyungjun Ko, Seoul (KR); Junghwan Park, Seongnam-si (KR)

(*) Notice: Subject to any disclaimer, the term of this patent is extended or adjusted under 35 U.S.C. 154(b) by 164 days.

(21) Appl. No.: 18/429,288

(22) Filed: Jan. 31, 2024

(65) Prior Publication Data

US 2025/0114717 A1 Apr. 10, 2025

(30) Foreign Application Priority Data

Oct. 6, 2023 (KR) ........................ 10-2023-0133738

(51) Int. Cl.

*A63H 9/00* (2006.01)
*A63H 3/48* (2006.01)
*B29C 45/14* (2006.01)

(52) U.S. Cl.

CPC ................. *A63H 9/00* (2013.01); *A63H 3/48* (2013.01); *B29C 45/14377* (2013.01)

(58) Field of Classification Search

CPC ... A63H 9/00; A63H 3/48; A63H 3/46; A63H 3/00; A63H 3/36; B29C 45/14377; B29C 45/14; B29C 65/56; B44C 3/04; B29L 2031/702

See application file for complete search history.

(56) References Cited

U.S. PATENT DOCUMENTS

| | | | | |
|---|---|---|---|---|
| 6,403,003 | B1 * | 6/2002 | Fekete | B29C 45/4421 264/318 |
| 6,544,094 | B1 * | 4/2003 | Maddocks | A63H 3/365 446/337 |
| 6,607,684 | B1 * | 8/2003 | Lee | B29C 45/14467 264/250 |
| 2004/0266315 | A1 * | 12/2004 | Ejima | A63H 9/00 446/373 |
| 2013/0186922 | A1 * | 7/2013 | Soto Velasco | A47F 8/02 223/66 |
| 2023/0256589 | A1 * | 8/2023 | Kohm | B25J 19/0075 74/490.01 |

FOREIGN PATENT DOCUMENTS

| | | | | |
|---|---|---|---|---|
| KR | 20-0187072 Y1 | | 6/2000 | |
| KR | 10-2001-0052477 A | | 6/2001 | |
| KR | 20-0320752 Y1 | | 7/2003 | |
| KR | 20090003976 U | * | 4/2009 | A63H 3/04 |

OTHER PUBLICATIONS

English translation of KR-20090003976-U by EPO. (Year: 2009).*

* cited by examiner

*Primary Examiner* — Inja Song
(74) *Attorney, Agent, or Firm* — Winston Hsu

(57) ABSTRACT

The present invention relates to a figure and a manufacturing method thereof, and the manufacturing method includes: a molding step of molding a skin surface in a mold and a first skeleton; a removing step of removing only the mold on the molded skin surface, and leaving the first skeleton; a coupling step of coupling the joint part to the second skeleton, and the first skeleton is made of a hard material, and the skin surface is injected as a soft material.

3 Claims, 5 Drawing Sheets

[FIG. 1]
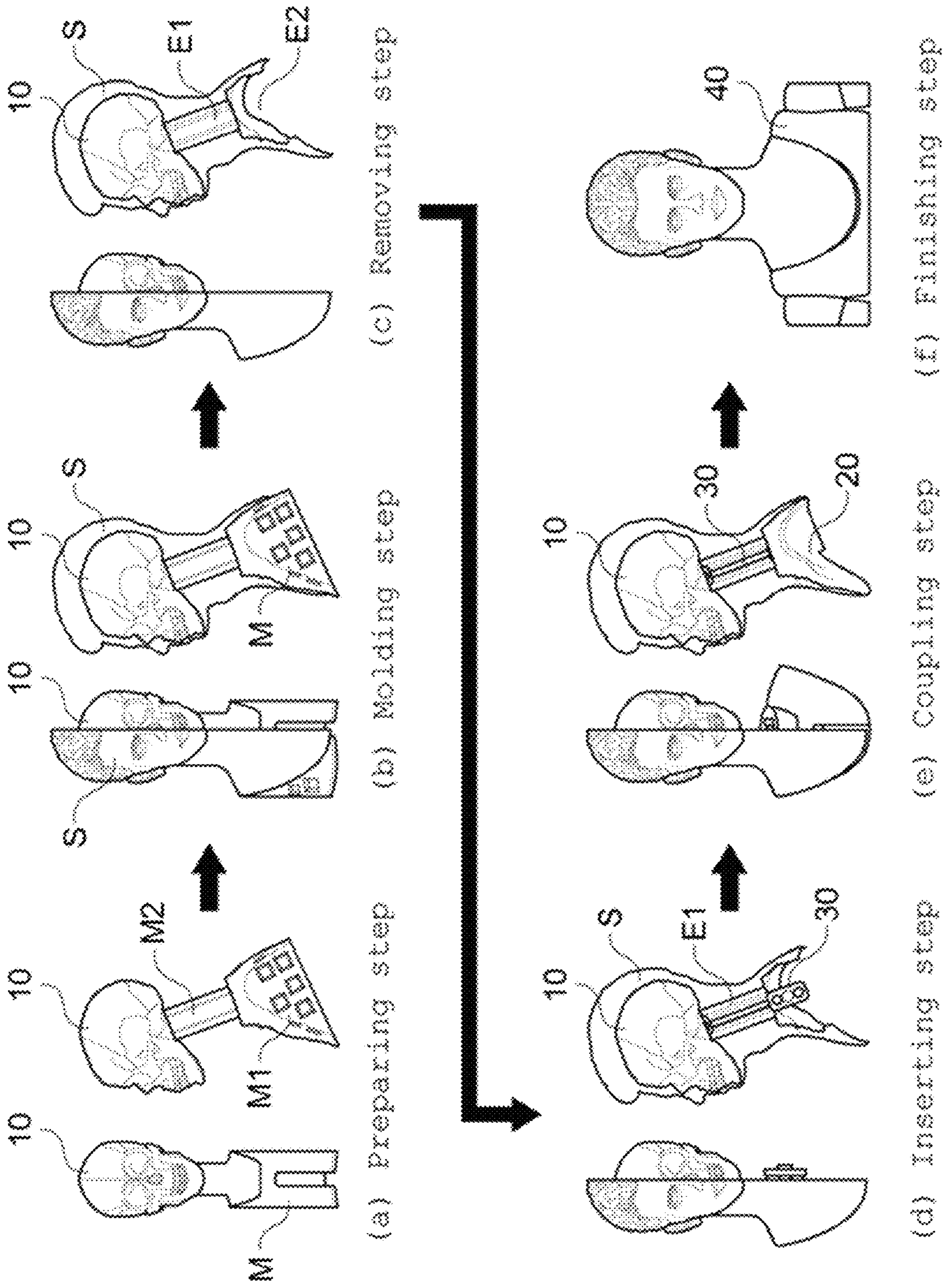

1
[FIG.2]
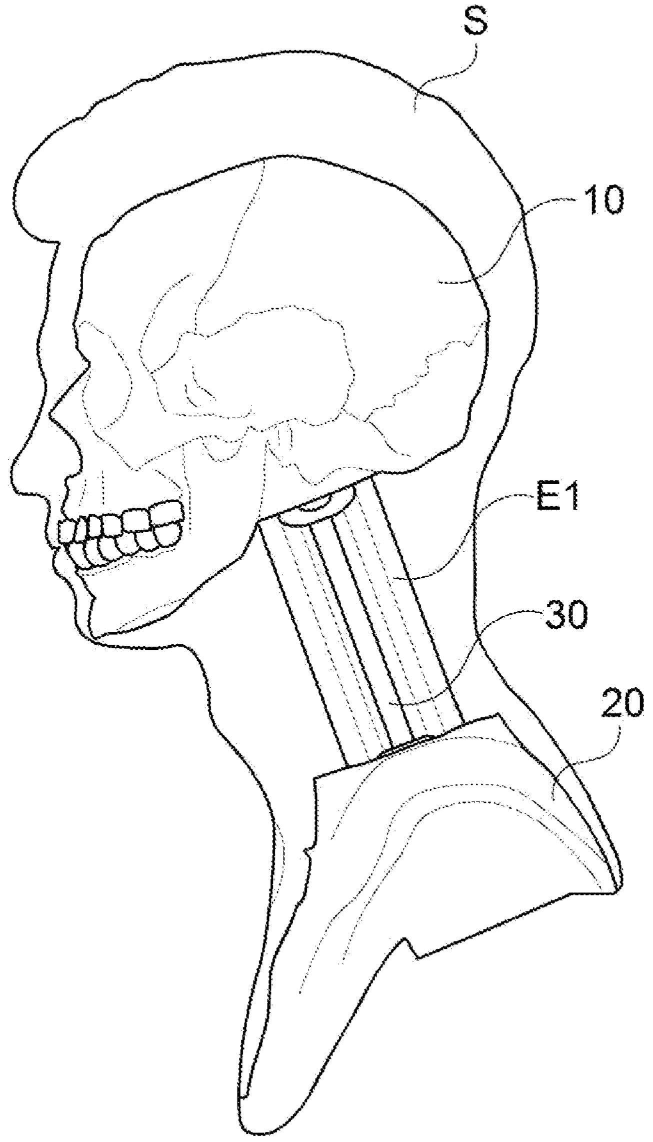

1
[FIG.3]
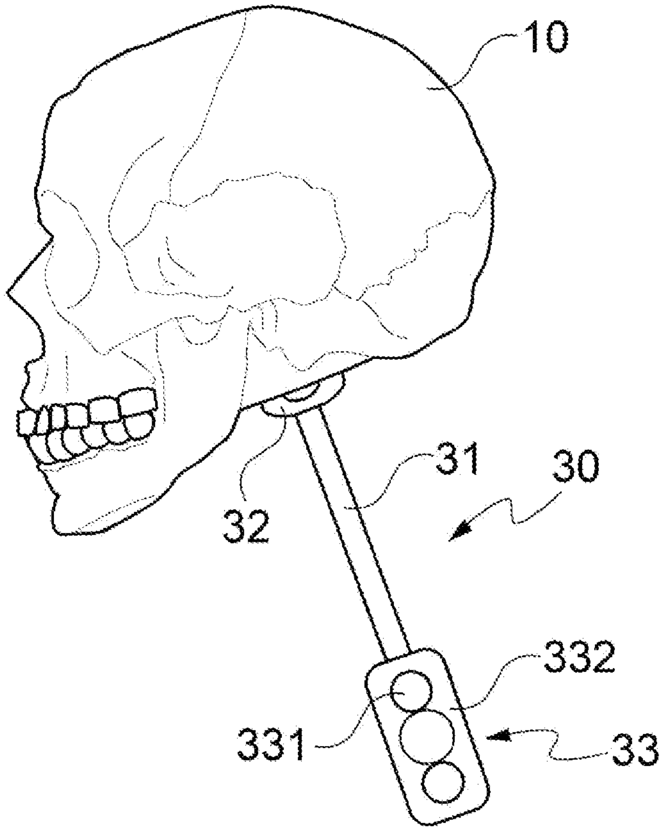

[FIG.4]
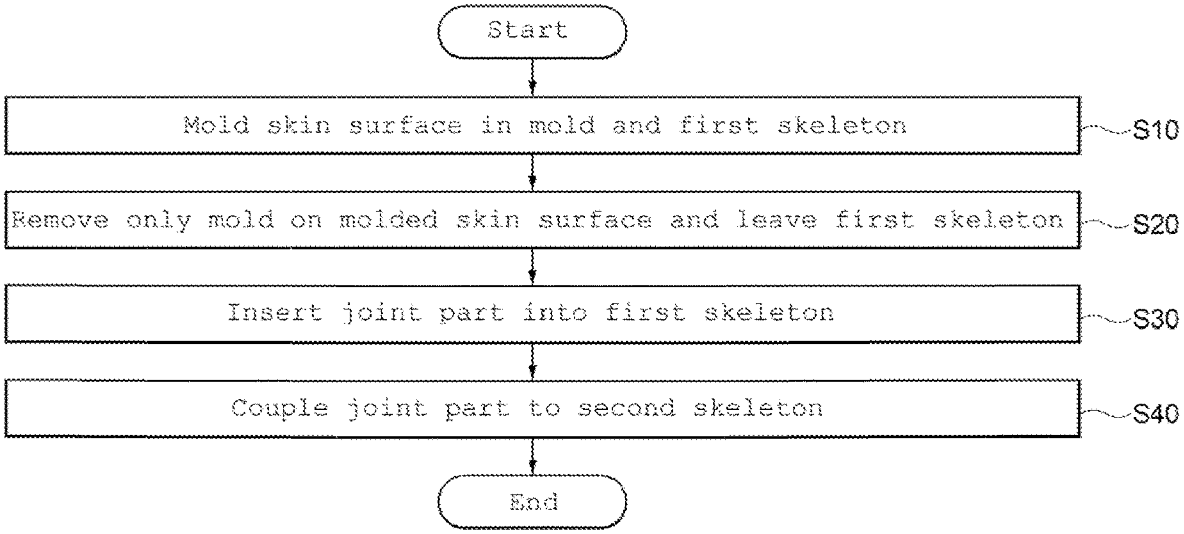
[FIG.5]
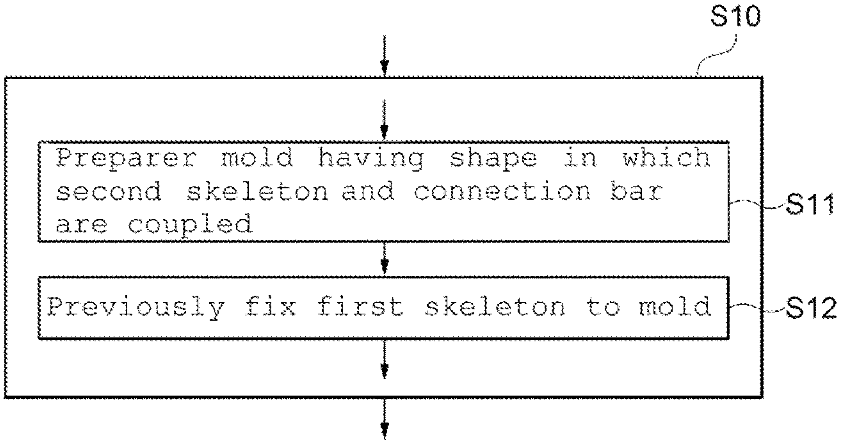

[FIG.6]
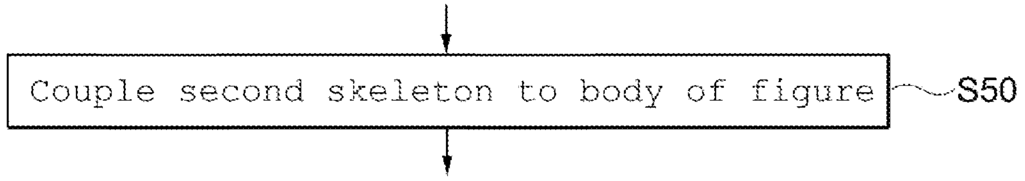

FIGURE AND MANUFACTURING METHOD THEREOF

BACKGROUND OF THE INVENTION

1. Field of the Invention

The present invention relates to a figure and a manufacturing method thereof, and more particularly, to a figure joint manufacturing method and a figure manufactured thereby.

2. Description of the Prior Art

A figure means a 3 dimension (D) model that reproduces things (buildings, cars, food, etc.), plants, animals, figures, celebrities, characters of animations or movies, specific scenes of the movies to a real size or a reduced size.

The figure is differentiated from toys and dolls in that the figure elaborately produced by imitating original characters and figures to be close to actual characters and figures as possible. The figure is generally made by reducing the original character, but in some cases, the figure may be manufactured at the same ratio as the original character or made to be larger than the original character.

As described above, a figure in a wide sense are used to mean a model that produces known characters or figures precisely. Meanwhile, a figure in a narrow sense for example, an action figure means a figure elaborately designed so as for each joint to move.

In addition, as the Kidult culture spreads, more collectors want to own figures that are generated by realistically embodying famous characters of the animations or movies, and a figures market grows rapidly as collecting or exhibiting value increases.

On the other hand, as scientific technology is developed, figure manufacturing technology is also developed jointly. Recently produced figures are manufactured of 3D models with excellent three-dimensional effects, and more realistic depictions are possible, so emotional empathy and delivery power are very good.

Early figures generally simulated the shape as close as possible with plastics, beeswax, and metal, but the recent figures containing action figures are similar to actual figures in terms shapes, as well as materials and textures, and furthermore, the early figures are developed for the joint to be driven.

Unlike a statue figure that maintains only a fixed posture, among the figures, the action figure can freely move arms, legs, etc., to show various postures and voice supporting, missile launching, etc., are supported through battery charging according to a feature of the character or an option of the action figure.

In most of methods for modifying the posture of the figure, the posture can be modified through manual manipulation, and a joint structure is applied to maintain a movement and a posture similar to a human body structure and a structure of the animal.

The figure adopting the joint structure is configured so that the joint structure of the figure is made to be rounded to enable the movement of the joint, and can have a similar form to people or the animals or an elaborate form, and show a natural operation.

However, the conventional figures have a problem in that there is a very awkward part of both parts attached to the joints, unlike the actual person, when they move each part of the figure through the joints. Therefore, there is a problem in which a simulation level of the figure for realistically embodying an actual character is significantly lowered, so satisfactions of consumers are lowered.

Therefore, in the present industry, continuous and active research and development are being conducted to solve the above problems.

SUMMARY OF THE INVENTION

The present invention is contrived to solve the problem in the related art, and an object of the present invention is to provide a figure and a manufacturing method thereof, which enable a more realistic movement of a joint to realistically reproduce a depiction target.

According to an exemplary embodiment of the present invention, a manufacturing method of a figure includes: a molding step of molding a skin surface in a mold and a first skeleton; a removing step of removing only the mold on the molded skin surface, and leaving the first skeleton; a coupling step of coupling the joint part to the second skeleton, and the first skeleton is made of a hard material, and the skin surface is injected as a soft material.

Specifically, the molding step may further include a step of previously fixing the first skeleton to the mold.

Specifically, the molding step further include a step of preparing a mold having a shape in which the second skeleton and a connection bar are coupled, and the connection bar may be configured to have a structure in which the first skeleton and the second skeleton are connected, and form a space in which the joint part is to be disposed.

Specifically, in the removing step, a space in which the second skeleton is to be disposed and the space in which the joint part is to be disposed may be formed inside the skin surface through removing the mold, and the space in which the joint part is to be disposed may be formed to be larger than the joint part.

Specifically, the manufacturing method may further include a finishing step of coupling the second skeleton to a body of the figure after the coupling step.

Further, according to an exemplary embodiment of the present invention, a figure includes: a first skeleton; a second skeleton facing the first skeleton; and a joint part connecting the first skeleton and the second skeleton, and the joint part includes an extender which extends lengthily in a longitudinal direction to form a distance between the first skeleton and the second skeleton, a first coupler formed at one side of the extender, and pivotably formed with a curved form, and a second coupler formed at the other side of the extender, and fixed to the second skeleton, and the second coupler includes a ball connected to the extender and having a ball shape, and a plate pivotably connected to the ball, and fixed to the second skeleton.

Specifically, the second skeleton may be connected to a body of the figure, the first skeleton may be made of a hard material, and a soft skin surface may be attached to exteriors of the first skeleton and the second skeleton.

Specifically, the joint part may be attached with the skin surface, and formed to be spaced from the skin surface by a predetermined interval.

In a figure and a manufacturing method thereof according to exemplary embodiments of the present invention, there is an effect in that the figure is manufactured so that a skull (first skeleton) is formed by a hard material, the skull is first fixed to a mold, and then a skin surface is injected into the mold by a soft material, so it can be reproduced that when a face of the figure rotates forward/backward, and left and right from a body of the figure, the face is fixed and rotated without bending while the body is fixed in place like an actual persons, and only a neck is naturally moved, so a more realistic depiction is enabled, and as a result, emotional empathy and delivery power are very good, thereby rapidly raising a value of the figure.

Effects which can be obtained in the disclosed exemplary embodiments are not limited to the aforementioned effects and other unmentioned effects will be clearly understood by those skilled in the art to which the disclosed exemplary embodiments belong from the following description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a flowchart illustrating a manufacturing method of a figure in order according to an exemplary embodiment of the present invention.

FIG. 2 is a side exploded view internally illustrating, from the side, a face and an upper body of a figure according to an exemplary embodiment of the present invention.

FIG. 3 is a side exploded view internally illustrating, from the side, a first skeleton and a joint part of the figure according to an exemplary embodiment of the present invention.

FIG. 4 is a flowchart of a manufacturing method of a figure according to an exemplary embodiment of the present invention.

FIG. 5 is a partial flowchart of the manufacturing method of a figure according to the exemplary embodiment of the present invention.

FIG. 6 is an additional flowchart of the manufacturing method of a figure according to the exemplary embodiment of the present invention.

DETAILED DESCRIPTION

The objects, specific advantages, and new features of the present invention will be more clearly understood from the following detailed description and the exemplary embodiments taken in conjunction with the accompanying drawings. In the present specification, when reference numerals refer to components of each drawing, it is to be noted that although the same components are illustrated in different drawings, the same components are denoted by the same reference numerals as possible. Further, in describing the present invention, a detailed explanation of known related technologies may be omitted to avoid unnecessarily obscuring the subject matter of the present invention.

Implementation examples and exemplary embodiments of the present invention will be described in detail so as to be easily implemented by those skilled in the art, with reference to the accompanying drawings. However, the present invention may be implemented in various different forms, and is not limited to the implementation example sand exemplary embodiments described herein. Further, the same or corresponding constituent elements are denoted by the same or similar reference numeral and a duplicated description thereof will be omitted and for easy description, the size and shape of each constituent member illustrated may be enlarged or reduced.

Terms used in the present application are used only to describe specific exemplary embodiments, and are not intended to limit the present invention. A singular form includes a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

The present invention relates to a figure and a manufacturing method thereof, and the figure and the manufacturing method thereof according to an exemplary embodiment of the present invention may be applied when forming joint parts of the figure. The present invention is not limited thereto, and may be primarily applied when forming human body simulation, for example, forming a neck joint portion connecting a head and a chest, or may be applied to joint portions a wrist joint portion in which a palm and a forearm are connected in an arm, an ankle joint portion in which a sole and a lower extremity are connected in a leg, etc. Further, the present invention may also be applied to depicting animals, plants, things, an environment, etc., in addition to the human body.

Hereinafter, a detailed description will be described in detail jointly with drawings illustrated below.

FIG. 1 is a flowchart illustrating a manufacturing method of a figure in order according to an exemplary embodiment of the present invention, FIG. 4 is a flowchart of a manufacturing method of a figure according to an exemplary embodiment of the present invention, FIG. 5 is a partial flowchart of the manufacturing method of a figure according to the exemplary embodiment of the present invention, and FIG. 6 is an additional flowchart of the manufacturing method of a figure according to the exemplary embodiment of the present invention.

As illustrated in FIGS. 1 and 4 to 6, in the manufacturing method of a figure according to the exemplary embodiment of the present invention, one FIG. 1 including a first skeleton 10, a second skeleton 20, a joint part 30, and a body 40 may be produced.

Hereinafter, prior to describing the manufacturing method of the figure according to the exemplary embodiment of the present invention in detail, a resulting produced FIG. 1 will be described in brief.

FIG. 2 is a side exploded view internally illustrating, from the side, a face and an upper body of a figure according to an exemplary embodiment of the present invention and FIG. 3 is a side exploded view internally illustrating, from the side, a first skeleton and a joint part of the figure according to an exemplary embodiment of the present invention.

As illustrated in FIGS. 2 and 3, the FIG. 1 according to the exemplary embodiment of the present invention may include the first skeleton 10, the second skeleton 20, the joint part 30, and the body 40.

The first skeleton 10 may be a component which is formed to face the second skeleton 20, and disposed at an outermost portion among components of the FIG. 1. When a human body is taken as an example, the first skeleton 10 may be preferably a skull corresponding to a head part, but is not limited thereto, and may be a palm bone corresponding to a palm or a sole bone corresponding to a sole.

The first skeleton 10 may be made of a hard material, and may be formed to be surrounded by a soft skin surface S, and may have a concave part having a large mortar shape so that a joint part 30 to be described below is connected to a lower side.

The second skeleton 20 may be a component which is formed to face the first skeleton 10, and disposed at an inner side among the components of the FIG. 1. When the human body is taken as an example, the second skeleton 20 may be preferably a shoulder corresponding to a chest part, but is not limited thereto, and may be a forearm part of an arm or a lower extremity part of a foot. A part name of the FIG. 1 may be, for example, body gimmick.

The second skeleton 20 may be made of the hard material, and may be formed to be surrounded by the soft skin surface S at an outer side, and may have a part engaged with the body 40 to be connected to the body 40 to be described below at a lower side.

The joint part 30 may connect the first skeleton 10 and the second skeleton 20, and the skin surface S is not closely contacted and attached to the outer side, but the skin surface S may be formed to be spaced apart from the outer side of the joint part 30 at a predetermined interval. That is, a space of a predetermined interval may be formed between the joint part 30 and the skin surface S. Alternatively, in another embodiment, a hard part having the same shape as a connection bar may be formed and attached between the joint part 30 and the skin surface S so as to maintain at least a part of a form of the skin surface S. In this case, this part may be configured not to be connected to the joint part 30, but to be connected to the first skeleton 10 or the second skeleton 20.

The joint part 30 includes an extender 31 which extends lengthily in a longitudinal direction so as to form a distance between the first skeleton 10 and the second skeleton 20, a first coupler 32 which is formed at one side of the extender 31 and has a curved form to be pivotally formed, and a second coupler 33 which is formed at the other side of the extender 31 and fixed to the second skeleton 20.

The extender 31 may have a shape of a bar, and a first coupler 32 may be formed at an upper side which is one side thereof and a second coupler 33 may be formed at a lower side which is the other side thereof. When the human body is taken as an example, the extender 31 may be a component for determining a length of a neck.

The first coupler 32 may be connected to the extender 31 at one side, and may have a shape of a wooden pestle, and may be pivotally formed by engaging with a concave portion having a large mortar shape, which is formed at the lower side of the first skeleton 10.

In this case, the first coupler 32 may be formed to move around infinite numbers of axes by engaging with the first skeleton 10.

The second coupler 33 includes a ball 31 which is connected to the extender 31 at the other side, and has a ball shape, and a plate 332 which is pivotably connected to the ball 331, and fixed to the second skeleton 20.

The body 40 which is a part which forms the remaining part in the FIG. 1 may be made of the hard material and fixed by engaging with the lower side of the second skeleton 20. Here, the body 40 may be a part corresponding to a body when the human body is taken as an example. Here, a part in which the body 40 and the second skeleton 20 are connected may be a part canceled by a cloth of the FIG. 1 and not viewed.

Hereinafter, the manufacturing method of the figure according to the embodiment of the present invention for producing the FIG. 1 will be described in detail.

As illustrated in FIGS. 1 and 4 to 6, the manufacturing method of the figure according to the embodiment of the present invention, as a molding step of molding a skin surface in a mold and a first skeleton, includes a step S10 including a step S11 of preparing a mold having a shape in which a second skeleton and a connection bar are coupled and a step S12 of previously fixing the first skeleton to the mold, a removing step S20 of removing only the mold from the molded skin surface, and making the first skeleton be left, an insertion step S30 of inserting a joint part into the first skeleton, a coupling step S40 of coupling the joint part to a second skeleton, and a finishing step S50 of finishing the second skeleton to a body of the figure.

In step S10 as the molding step, the skin surface is molded in the mold and the first skeleton.

In order to manufacture the FIG. 1 of the present invention, a mold M and the first skeleton 10 having a hard property are prepared, and then the mold M and the first skeleton 10 are coupled and fixed, a material acquired by melting a material a soft property is injected to both the mold M and the first skeleton 10 to mold a skin surface S. Here, an injection molding machine may be used in order to mold the skin surface S in the mold M and the first skeleton 10, and a molding material may be silicone, polyester, PVC, polyurethane, polystone, or a mixture thereof.

Specifically, the molding material will be described below.

In step S11, a mold having a shape in which the second skeleton and a connection bar are coupled is prepared. The mold M may have a structure in which a mold M1 having a shape of the second skeleton and a connection bar mold M2 are coupled, and for example, the mold M1 having the shape of the second skeleton may have a form of the chest and the connection bar mold M2 may have a form of the neck. Here, the connection bar mold M2 may be configured to have a structure of connecting the first skeleton 10 and the second skeleton 20, and to form a space larger than the joint part 30 to ensure a space in which the joint part 30 to be described below is to be disposed.

In step S12, the first skeleton is previously fixed to the mold. When a mold M is prepared in which the mold M1 having the shape of the second skeleton and the connection bar mold M2 are coupled, the first skeleton 10 is fixed to an end portion of the connection bar mold M2. That is, the first skeleton 10 is previously fixed to the mold M before injecting the skin surface S into the mold M. Here, the first skeleton 10 and the mold M may be detachably fixed, and for example, the first skeleton 10 may have a skull form.

After the first skeleton 10 is fixed to the mold M, the material acquired by melting the material having the soft property into both the mold M and the first skeleton 10 is injected through the injection molding machine to mold the skin surface S. That is, the skin surface S is integratedly molded in both the mold M and the first skeleton 10.

In the related art, each of a part corresponding to the head and a part corresponding to the chest is molded, and the next is jointly formed in the part corresponding to the head, and a ball joint is formed at a chest portion, and then the part corresponding to the head is coupled to the ball joint. In this case, when the face is rotated, there is an awkwardness that the neck is turned jointly with the face, and a portion in which the head and chest parts are connected is a portion exposed to the outside other than the portion concealed by the cloth of the figure unlike the actual person, so a line on which the both head and chest parts are divided are shown, and as a result, there is a problem in that reality like the actual persons significantly deteriorates.

Therefore, in order to maximize the reproduction of the actual person in the present invention, the part corresponding to the head and the part corresponding to the chest are integrated to form the skin surface (S, and when the face is rotated, the head and the neck may be sequentially rotated like the actual person. That is, the chest is fixed and the head beings to rotate first, and next, the figure may naturally move like the actual persons while the next rotates. Moreover, the skin surface S is integratedly formed without the portion where the head and chest parts are connected, and the chest part and the body are coupled to the part concealed by the cloth of the FIG. 1, so the line in which the chest part and the body are divided is not viewed, and the reality like the actual person is maximized.

However, even in this case, when an inside and an outside of the part corresponding to the head are molded with the material having the soft material, if the face moves forward/backward, and left and right, there is a problem in that the neck and the face are bent and extended due to the soft material unlike the actual person. In order to the problem, in the present invention, upon molding the part corresponding to the head, the first skeleton 10 corresponding to the skull is inserted into the inside and the first skeleton is manufactured by a material having a hard property other than the soft material. As a result, when the face moves forward/backward, and left and right, the face is rotated, and the neck is subsequently bent and rotated without bending and drooping of a face skin like the actual person. Of course, in this case, the chest is fixed.

In the manufacturing method of the figure according to the embodiment of the present invention, the first skeleton 10 is first fixed to the mold M, and then the soft skin surface S are integrated into both the hard first skeleton 10 and mold M, and molded, so when the face moves forward/backward, and left and right, the neck is bent and rotated while the chest is fixed like the actual person, and the face rotates without bending and drooping. Therefore, since a most realistic depiction than the related art is possible, emotional empathy and delivery power are very good, thereby rapidly raising a value of the FIG. 1.

In step S20 as the removing step, only the mold is removed from the molded skin surface, and the first skeleton is left.

Since both the mold M in which the mold M1 having the shape of the second skeleton and the connection bar mold M2 are coupled are formed as the mold M, if the mold M is removed, a space E2 in which the second skeleton 20 is to be disposed and a space E1 in which the joint part 30 is to be disposed are formed inside the skin surface S. In this case, the space E1 in which the joint part 30 is to be disposed is formed to be larger than the joint part 30, and may have, for example, a cylindrical shape.

The first skeleton 10 is separated from the mold M, and is left in the skin surface S, and the skin surface S which is injected and formed may be formed in all directions other than the lower side, and the lower side may have a state in which only a part coupled to the connection bar mold M2 is coupled is opened.

In step S30 as the insertion step, the joint part is inserted into the first skeleton.

Since the first skeleton 10 has the state in which the lower side is opened, the first skeleton 10 is connected to the joint part 30 through the opened lower side.

The joint part 30 is disposed in a space formed through the connection bar mold M2, and formed to connect the first skeleton 10 and the second skeleton 20, and formed to extend lengthily in the longitudinal direction to ensure a predetermined distance between the first skeleton 10 and the second skeleton 20.

The joint part 30 may have a large mortar type joint in which the part connected to the first skeleton 10 is formed to be rotatable in all directions, and the part connected to the second skeleton 20 may have a joint formed to be movable forward/backward.

When the first skeleton 10 and the joint part 30 are coupled, both the first skeleton 10 and the joint part 30 are surrounded by the skin surface S, and only the lower side of the joint part 30 is opened.

In step S40 as the coupling step, the joint part is coupled to the second skeleton.

Since the joint part 30 has the state in which the lower side is opened, the joint part 30 is connected to the second skeleton 20 through the opened lower side. The joint part 30 may have a body having a plate shape so that an end portion connected to the second skeleton 20 is inserted into and fixed to the second skeleton 20, and formed so that a ball-shaped part is coupled to the inside the plate-shaped body to be pivotable forward/backward (or in all directions).

The second skeleton 20 may be formed to have a structure of being connected to the body 401 and the part connected to the body 40 may be formed at a portion concealed by the cloth of the FIG. 1.

When the joint part 30 is coupled to the second skeleton 20, both the second skeleton 20 and the joint part 30 are surrounded by the skin surface S, and only the lower side of the second skeleton 20 is opened.

In step S50 as the finishing step, the second skeleton is coupled to the body of the figure.

Since the second skeleton 20 has the state in which the lower side is opened, the second skeleton 20 is connected to the body 40 of the FIG. 1 through the opened lower side.

As the body 40 of the FIG. 1 is connected to the second skeleton 20, both the joint part 30 and the first skeleton 10 are also coupled and fixed to the body 40, and the form of the FIG. 1 is finally completed.

In the figure and the manufacturing method thereof according to the exemplary embodiments of the present invention, there is an effect in that the figure is manufactured so that a skull (first skeleton) is formed by a hard material, the skull is first fixed to a mold, and then a skin surface is injected into the mold by a soft material, so it can be reproduced that when a face of the figure rotates forward/backward, and left and right from a body of the figure, the face is fixed and rotated without bending while the body is fixed in place like an actual persons, and only a neck is naturally moved, so a more realistic depiction is enabled, and as a result, emotional empathy and delivery power are very good, thereby rapidly raising a value of the figure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A manufacturing method of a figure, comprising:

a molding step of molding a skin surface over a mold and a first skeleton;

a removing step of removing only the mold from the molded skin surface, and leaving the first skeleton;

an inserting step of inserting a joint part into the first skeleton and a coupling step of coupling the joint part to a second skeleton, the joint part being between the first skeleton and the second skeleton, wherein the first skeleton is made of a hard material, and the skin surface is injected as a soft material, wherein in the removing step, a space in which the second skeleton is to be disposed and a space in which the joint part is to be disposed are formed inside the skin surface through the removing step, and the space in which the joint part is to be disposed is formed to be larger than the joint part, wherein the skin surface is formed integrally across the first skeleton, the joint part, and the second skeleton through the coupling step, and surrounds the joint part, but has an open portion only for a lower side of the second skeleton, wherein the molding step further includes a step of preparing the mold having a structure in which a first mold having a shape of the second skeleton and a second mold of a connection bar are coupled, and the connection bar is configured to have a structure in which the first skeleton and the second skeleton are connected, and forms the space in which the joint part is to be disposed.

2. The manufacturing method of a figure of claim 1, wherein the molding step further includes a step of fixing the first skeleton to the mold prior to the molding.

3. The manufacturing method of a figure of claim 1, further comprising: a finishing step of coupling the second skeleton to a body of the figure after the coupling step.

* * * * *